United States Patent [19]

Stein

[11] Patent Number: 4,623,091

[45] Date of Patent: Nov. 18, 1986

[54] INTEGRATED FLOAT AND THERMOSTATIC STEAM TRAP

[76] Inventor: Marcel Stein, 560 Riverside Dr., New York, N.Y. 10027

[21] Appl. No.: 751,452

[22] Filed: Jun. 28, 1985

Related U.S. Application Data

[63] Continuation of Ser. No. 592,100, Mar. 22, 1984, abandoned.

[51] Int. Cl.$^4$ .............................................. F16T 1/02
[52] U.S. Cl. ........................................ 236/52; 236/55; 137/192
[58] Field of Search ........................... 236/52, 53, 55; 137/192, 195

[56] References Cited

U.S. PATENT DOCUMENTS

| | | | |
|---|---|---|---|
| 1,163,316 | 12/1915 | Brown | 236/53 X |
| 1,962,360 | 6/1934 | Pflugheber | 236/53 |
| 2,107,551 | 2/1938 | Simpson | 236/53 |
| 2,825,508 | 3/1958 | Velan et al. | 236/53 |
| 3,489,348 | 1/1970 | Fujiwara | 236/53 |

*Primary Examiner*—William E. Tapolcai

[57] ABSTRACT

This invention pertains to a float and thermostatic steam trap with an improved mechanism less subject to failure than previous designs. In this design the venting and trapping functions are served by the same valve and a thermostatic actuator acts on the float or float linkage when temperature is below a predetermined value. In normal operation the float controls the discharge of condensate and the thermostatic actuator is out of contact with the float assembly and therefore is free to move. When the temperature within the trap housing drops below the predetermined value, the thermostatic actuator engages the float assembly, forces the valve opening and raises the float above the condensate level. This allows the removal of condensate and of the noncondensible gasses from the trap. This design eliminates the stressing of the thermostatic actuator by static or vibration loads at high temperatures and thereby reduces the fatigue failure of the actuator. At the same time, as the float is raised out of the water, the water level is lowered or completely drained, thereby reducing corrosion exposure during shutdown. In the embodiments wherein the housing is completely drained by the thermostatic actuator frost protection is provided and the accumulation of solids within the housing is prevented by flushing action.

19 Claims, 7 Drawing Figures

INTEGRATED FLOAT AND THERMOSTATIC STEAM TRAP

This application is a continuation of application Ser. No. 592,100, filed Mar. 22, 1984, now abandoned.

BACKGROUND OF THE INVENTION

1. FIELD OF THE INVENTION

This invention pertains to a steam trap equipped with automatic drain and vent means configured to obviate the often needed external bypass, to eliminate shutdown corrosion, air vent fatigue, optionally, exit passage erosion, and to enhance the removal of sediments from the body.

Some of the embodiments of this invention pertain to a steam trap with a valve arranged at the bottom of the trap body which, during normal operation, is controlled by a float, during shutdown and start-up is opened by a thermostatic device and is also controlled by said thermostatic device when non-condensible gases accumulate above the condensate level.

2. BACKGROUND AND PRIOR ART

Present float-type steam traps are typically provided with a thermostatic air vent. Therefore, most of the discussion will address such Float and Thermostatic (F&T) steam traps, although several of the innovations described herein are applicable to other types of steam traps as well. The problems addressed by this invention are related to corrosion, failure of the thermostatic vent, the handling of corrosion product accumulations, the need for trap bypass, and exit passage erosion, all inherent in present designs. Most present designs also tend to have failure modes which are not self-annunciating, thus go undetected for long periods. The hidden leakages into the common exit lines result in large losses of steam and in difficulties with the condensate handling equipment.

Shut-down corrosion in float-type steam traps occurs because they are designed to retain condensate below a certain level in the body, and because sensitive parts of the device are not designed to prevent condensate retention during shut-down. Since most heating systems allow the entry of air during shut-down as the steam pressure drops below atmospheric pressure, the water and air together attack the sensitive parts. In addition, in F&T steam traps the thermostatic vent, connected to the exit passage and open during shut-down, allows the reentry of warm condensate vapors from the condensate return system. This, too, supports corrosive interaction with the system components. Corrosion, in addition to destroying surface and component integrity, also produces corrosion products which often interfere with the operation of system components and also can be the source of further corrosion.

Thermostatic vents often fail due to vibrations transmitted to the bellows and to fatigue.

It is well known that steam and condensate wash away corrosion products, scale and other solids, while flowing through a steam heating system. The larger pieces of these are screened out by strainers, usually arranged before steam traps. Fine rust and other minute particles, however, pass through the screens of the strainers and settle at the bottom of float-type steam traps. Accumulations of these fine particles often obstruct the free motion of the floats of steam traps, leading to their malfunction.

Some F&T traps are installed with manual bypass valves in order to accelerate the removal of the air and the excessive amount of condensate present in the piping during start-up. These valves are supposed to be opened by the personnel for the duration of the start-up; however, they are often left open inadvertently or on purpose during the operating periods. They are also subject to shutdown corrosion. Both of the above conditions contribute to the hidden system failures.

The air vents of most current F&T traps are connected to the exit passage. In some designs the exit passage is directly connected to the condensate return lines. Here vapors can re-enter the trap during shutdown and cause corrosion. In other designs an integral water seal is provided; here the corrosion of the flange between the internal passages can lead to hidden failures.

A common damage mechanism in existing steam traps is exit passage erosion. This is due to the labyrinthine exit passages, designed to minimize the trap dimensions. The high velocity caused by the condensate flashing in the low pressure region results in the entrainment of water droplets. The fast moving droplets erode the components of the exit passage. Such erosion has been observed across from the float valve and around it, the latter due to turbulence.

In the present art, an automatic drain valve is available to protect the steam traps from frost damage. Because of its limited purpose, this is available only with a small opening and is actuated either by thermostatic action or by differential pressure. Therefore it does not provide adequate bypass capacity for the air and condensate during start-up, and it is known to be prone to clogging by corrosion products and to cycling during low duty cycle operation when the condensate cools down.

SUMMARY OF THE INVENTION

The present invention overcomes the above mentioned disadvantages of the prior art and, in doing so, provides a steam trap of novel, improved design and unsurpassed simplicity. In several embodiments only one valve is used for normal operation, for venting and for draining.

The shutdown corrosion is prevented as either all condensate or at least from corrosion sensitive parts (e.g., valve seats) of the device. The mechanisms inside the vessel of the trap are designed so that they do not retain condensate once the trap is drained.

In one of the embodiments, air and condensate removal during start-up is accomplished by an automatic drain valve which is sized appropriately for the task, and concurrently by the float valve controlled by a thermostatic actuator during start-up. Practically all the non-condensible gases and excess condensate are removed from the body before the drain valve is closed.

In the same embodiment, during normal operation, non-condensible gases are vented through the float valve controlled by a thermostatic actuator during the accumulation of such gases above the condensate level. The usual thermostatic valve is therefore obviated.

In several other embodiments of this invention, only one actuator is used, alternately, controlled by a thermostatic valve and the float, for venting, for draining and for normal operation. Neither steady state nor vibration forces are transmitted from the float means to the thermostatic actuator while the float valve is controlled by the float. This isolation extends life of the thermostatic actuator.

Exit passage erosion is mitigated because both the float valve and drain valve exit passages are straight lines ending in an optional water seal. The seal cushions the impact of the water droplets.

Any accumulation of rust is removed through the drain valve at each shutdown and start-up when the embodiment with drain valve is used. Clogging of the drain valve is prevented by adequate sizing and clearance.

No accumulation of sediments can occur in the embodiment applying only one valve because the semiments are constantly removed by the flow of the condensate.

BRIEF DESCRIPTION OF THE DRAWINGS

Several embodiments of the invention will be described in detail below with the aid of the accompanying drawings, in which.

DESCRIPTION OF THE PREFERRED EMBODIMENTS

Figure 1:
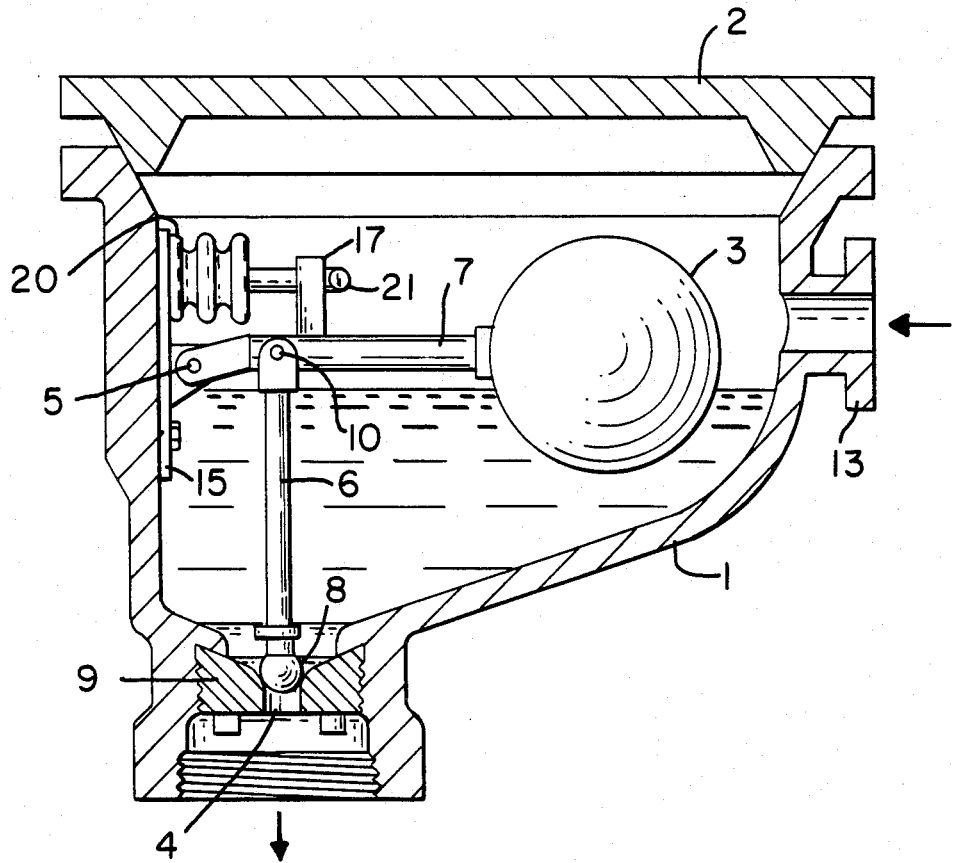
FIG. 1 is a cross-section of a steam trap provided with a float valve at the bottom of the body controlled by a float during operation and by a thermostatic actuator during start-up and shutdown, as well as during accumulations of non-condensible gases over the condensate level, FIG. 2 demonstrates a cross-section of a free float steam trap provided with a thermostatic actuator controlling the float during shutdown and start-up, as well as at times of need for venting.

In FIG. 1, a body of a steam trap is denoted by 1, its cover by 2, a float by 3, a valve plug by 8, a valve ring by 9, a valve seat by 4, a fulcrum by 5, a float arm by 7, an extension arm by 17, a valve rod by 6, a pin by 10, a thermostatic actuator by 20 and its extension by 21.

The thermostatic actuator 20 is in the form of a bellows which expands when subjected to heat and contracts upon cooling. As shown in FIG. 1, the bellows is secured at one end to a fixed support 15 and is provided with an extension rod 21 projecting from its opposite end. The rod 21 passes through the extension arm 17 extending vertically from the arm 7.

During operation, valve plug 8 is controlled by the float 3 pivoting around fulcrum 5 through float arm 7, pin connection 10 and valve rod 6 in a way well known in the art. As long as the space above the condensate level is filled with steam, thermostatic actuator 20 can freely expand without influencing the motion of float arm 7 so that the motion of valve plug 8 is only controlled by the water level through the float 3.

During shutdown and at other times during which the space above the condensate level is cool, the thermostatic actuator 20 contracts and lifts the float valve 8 regardless of how much condensate is contained in the trap, if any. This allows the non-condensible gases and condensate to be vented and drained, respectively, through the open valve passage 4 until such time that the space surrounding the thermostatic actuator is filled with steam which causes its expansion, turning over the control of the valve plug 8 to the float 3.

Figure 2:
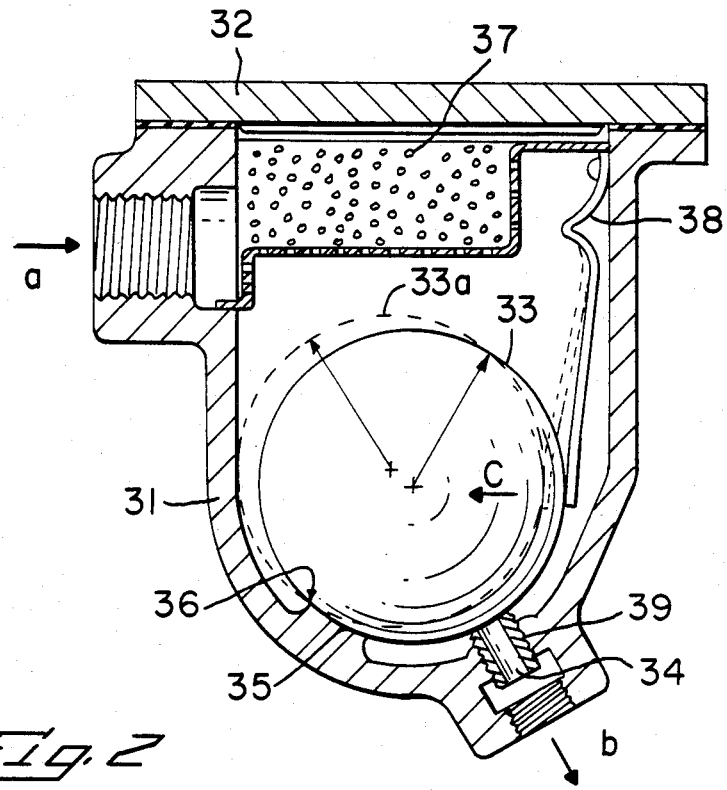
FIGS. 2a and 2b are cross-sections of other embodiments of a free float steam trap according to the present invention.

In FIG. 2 a body of a free float steam trap is denoted by 31, its cover by 32, its float by 33, a valve ring inserted into body 31 by 39 with orifice 34. The float 33 rests on a boss 35 of the body when it closes the orifice 34. A strainer 37 is arranged near an inlet shown by arrow a, and a thermostatic actuator 38 is mounted at the upper part of the body.

During normal operation, the float 33 is lifted by the incoming condensate, the thermostatic element 38 is in its expanded position shown in solid line and condensate is discharged through the open orifice 34.

At start-up and during shutdown the low temperature of the space surrounding the thermostat 38 causes its contraction, resulting in the displacement of the float in the direction of the arrow c. The float 33 following the horizontal direction is lifted due to the reaction force generated at the edge 36 of the boss 35, thereby opening the orifice 34 which vents and drains the body until steam heats up the thermostatic actuator. The following expansion of the thermostatic actuator allows the float to close the orifice 34 under the influence of its own weight after which the control of the valve is taken over by the float itself which is acting as a valve plug. Non-condensible gases possibly accumulating over the condensate level in the trap cool down the thermostatic actuator, its contraction also causing draining and venting until the upper space is heated up by the steam again due to which the expanding thermostatic actuator allows the float to close the orifice after which normal operation is restored.

Figure 2A:
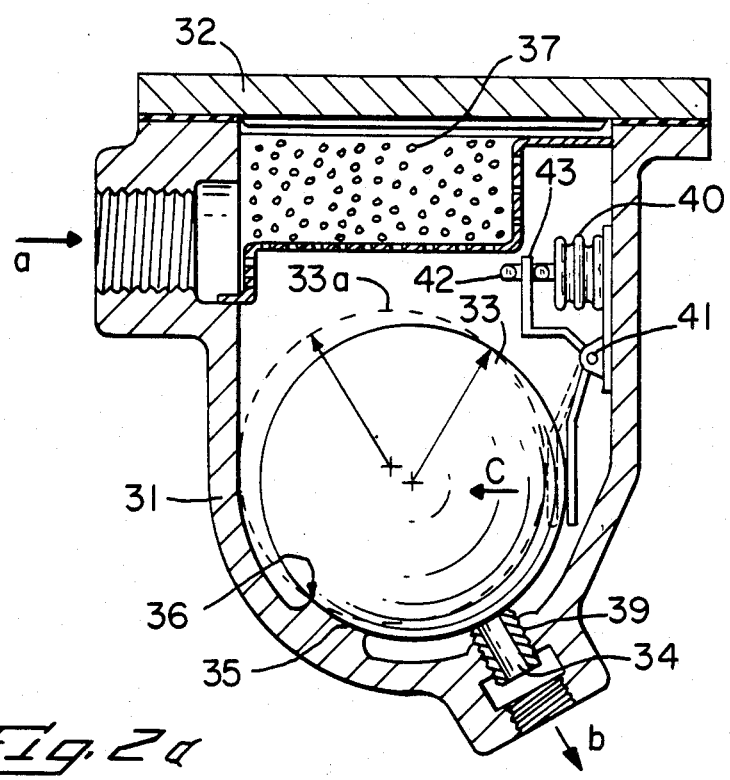

FIG. 2a shows an embodiment relating to a free float trap in which the thermostatic actuator is a bellows 40 which, during contraction, rotates through its extension 42, double armed lever 43, around fulcrum 41 in the clockwise direction and thereby displaces the float 33 in the direction of "C". The design and operation of this embodiment is in all other respects the same as that of FIG. 2.

Figure 2B:
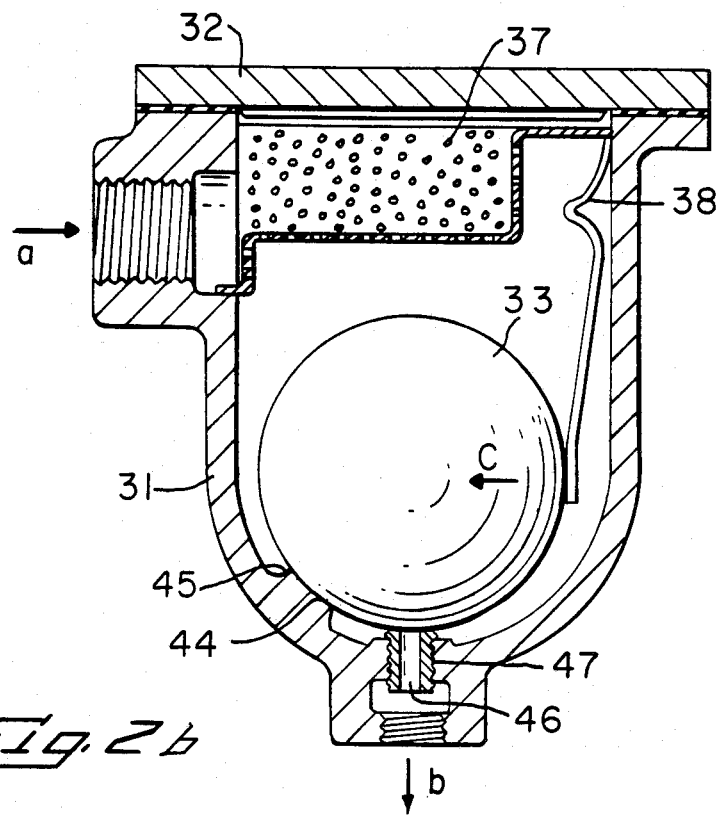

In FIG. 2b a valve ring 47 and orifice 46 are arranged at the bottom of the body 31 of a free float steam trap and a boss 44 is located at a somewhat higher level than in FIGS. 2 and 2a. When the thermostatic actuator 38 contracts due to cold temperature, it moves the float in the direction of arrow c and rotates it in the counterclockwise direction around edge 45, thereby lifting it from the valve seat and opening the orifice 46. The design and operation of this embodiment is identical with that of FIGS. 2 or 2a.

FIGS. 2 and 2a show the axes of the inlet and exit openings as well as the direction of action of the thermostatic actuator in the same plane, namely the plane of the drawing. However, it is advantageously possible to arrange the exit opening with its axis in a plane perpendicular to the plane defined by the axis of the inlet opening and the direction of action of the thermostatic actuator. Conversely, the thermostatic actuator may be arranged with its direction of action in a plane perpendicular to the plane defined by the axes of the inlet and exit openings.

Figure 3:
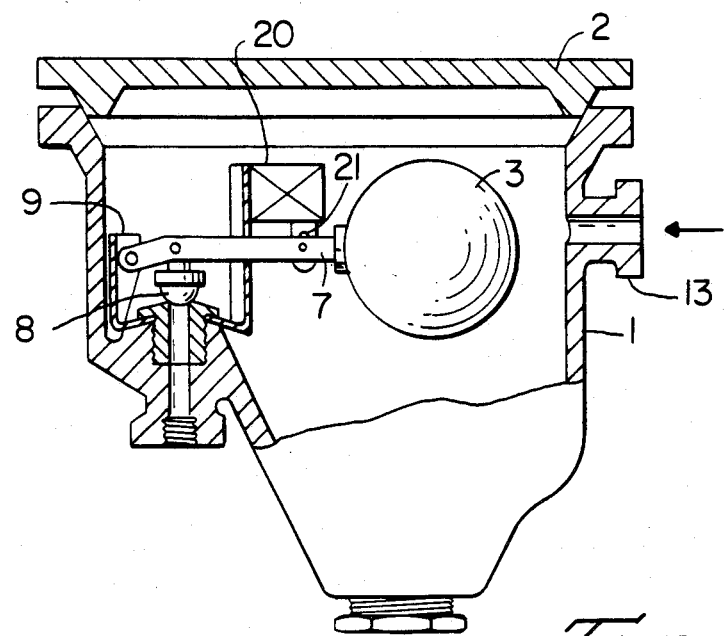
FIG. 3 shows the cross-section of a steam trap comprising a thermostatic actuating device which opens the float valve to permit the passage of non-condensible gases to the condensate discharge line as long as such gases are present in the body.

FIG. 3 shows a partial cross-section of another embodiment of the invention. The salient feature of this embodiment is a thermostatic actuator which serves to vent the non-condensible gases during normal operation, and start-up as well as to drain the condensate during shutdown and start-up.

During shutdown, the thermostatic actuator 20 cools down and thus lifts float arm 7 by link 21, attached to float valve assembly 9, opening float valve 8.

During normal operation, the steam heats up the thermostatic actuator 20 which then allows the float valve to function as known in the art. When air accumulating above the condensate level cools down the thermostatic actuator 20, the latter then opens float valve 8 via link 21 and float arm 7. Consequently, the condensate level drops and the non-condensible gases escape through the float valve until the steam replacing the gases heats up the actuator 20 which then allows the float valve to resume its normal function.

Figure 3A:
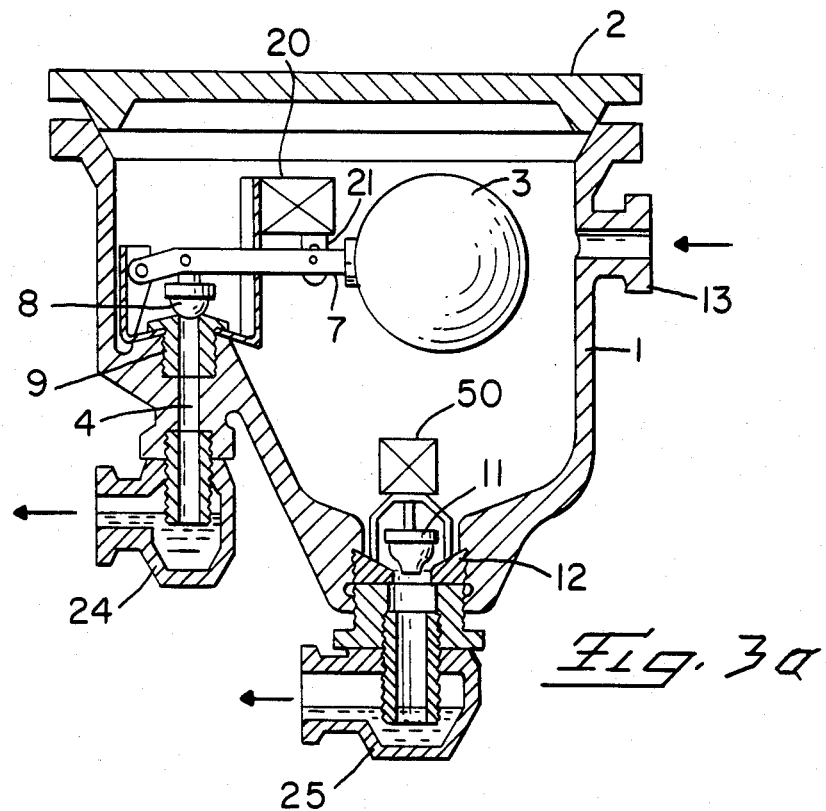
FIG. 3a shows the cross-section of a steam trap as shown in FIG. 3 with automatic drain valve and water seals.

FIG. 3a is the cross-section of the same embodiment with water seals 24 and 25 in place.

During shutdown, the drain valve 11 is open and the vessel is empty. During start-up, the air and condensate are discharged through open float valve 8 and drain valve 11.

In order to prevent vapors re-entering into the body 1 from the connecting condensate line through the float valve opened by the thermostatic actuator 20, a condensate water seal 24 is arranged between the condensate discharge opening of the body 1 and the condensate line.

When the drain valve exit opening is connected to a condensate line, a drain water seal 25 is arranged to prevent vapors from the connecting condensate line from re-entering into the body 1 through the open drain valve. When frost protection is needed, water seals 24 and 25 have to be omitted. If, for practical reasons, the recovery of the condensate discharged through the automatic drain valve is not desirable, the drain water seal 25 may be omitted.

When the arrangement of an automatic drain valve as described before is not feasible within the body of the steam trap (e.g. to drain an existing steam trap), the automatic drain valve assembly can be installed in a drain line connected to the drain port of the steam trap.

Figure 4:
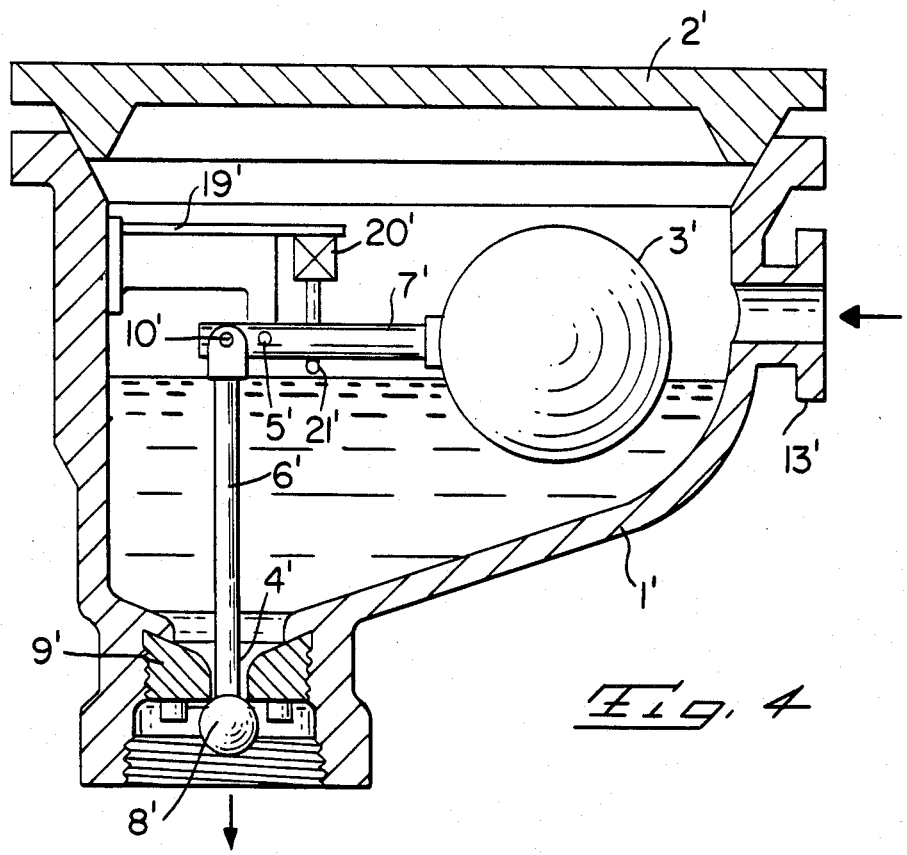
FIG. 4 is a cross-sectional view of a further embodiment of the invention.

FIG. 4 represent a further embodiment of the invention wherein the primed (') numbers represent elements the same as previously described by the same unprimed numbers. The major difference herein as compared to the emoodiments of FIG. 1 is the use of a plug 8' extending through valve passage 4'. The double armed lever 7' pivots around the fulcrum 5'. The rising float 3' lowers the plug 8' through rod 6' opening valve passage 4'.

While I have illustrated and described this invention with respect to several embodiments, it should be understood that still other modifications may be made without departing from the spirit and scope of this invention as defined by the following claims.

I claim:

1. A steam trap comprising a substantially closed compartment having an inlet for condensate and steam and an orifice for permitting discharge of condensate and/or gases, float means movable to alternately effect closing and opening of said orifice in dependence on the liquid level in the compartment and thermo-responsive means controlled by the temperature within the compartment for operating said float means to effect opening of said orifice and bringing said float means out of contact with any liquid in said compartment and holding said float means in elevated position for the duration of shutdowns when the temperature within the compartment is below a predetermined temperature.

2. A steam trap according to claim 1 wherein said first; means includes a free floating ball.

3. A steam trap according to claim 2 wherein said thermo-responsive means is a bi-metallic element movable toward and from said first means.

4. A steam trap according to claim 2 wherein the outlet orifice is arranged at the bottom of the closed compartment in order to drain it during shutdowns.

5. A steam trap according to claim 1 wherein said first means movable includes a valve, float means and means operated by the float means for moving said valve to alternately open and close the orifice.

6. A steam trap according to claim 5 further including a further arm pivoted at one end of said arm, said float means being secured at the opposite end of said further arm, said valve being connected to said further arm intermediate its ends.

7. A steam trap according to claim 6 wherein the outlet orifice is arranged at the bottom of the closed compartment in order to drain it during shutdowns.

8. A steam trap according to claim 6 wherein both the fulcrum of the arm of the float means and the thermoresponsive means are secured by a single means.

9. A steam trap according to claim 4 wherein the float means, its fulcrum and the thermoresponsive means are secured within the closed compartment as a preassembled entity.

10. A steam trap according to claim 8 wherein the float means, its fulcrum and the thermoresponsive means are secured within the closed compartment as a preassembled entity.

11. A steam trap according to claim 5 wherein the outlet orifice is arranged at the bottom of the closed compartment in order to drain it during shutdowns.

12. A steam trap according to claim 5 including an arm pivoted intermediate its ends, said float means being secured at one end of said arm, said valve being connected to said arm adjacent its opposite end, said thermo-responsive means being secured between said arm and a fixed member.

13. A steam trap according to claim 12 wherein both the fulcrum of the arm of the float means and the thermoresponsive means are secured by a single means.

14. A steam trap according to claim 1 including a water-seal trap connected at the outlet end of said orifice for preventing back-up of steam from the discharge.

15. A steam trap according to claim 1 wherein the thermo-responsive means is free of contact with the float means when the temperature within the compartment is at an eleveated temperature to avoid transmission of any vibrations occurring at the float means to the thermo-responsive means.

16. A steam trap according to claim 1 wherein the thermo-responsive means is out of contact with any condensate in the compartment.

17. A steam trap according to claim 1 wherein the outlet orifice is arranged at the bottom of the closed compartment in order to drain it during shutdowns.

18. A combined float and thermostatically controlled stream trap comprising a main trap body having an internal fluid chamber and fluid inlet and outlet passages leading from said chamber with a single valve seat in said fluid outlet passage, float means within said chamber movable to effect the opening and closing of the valve seat in the fluid outlet passage to close said outlet when the condensate level in said chamber is low and open it when said condensate level is high, and thermostatic means to prevent the closure of said single valve seat in the fluid outlet passage at low temperature by simultaneously lifting said float means above any condensate level present within said internal fluid chamber, on one hand to prevent shutdown corrosion of said float, and on the other hand to allow said float to control the condensate level within said chamber independently at a high temperature.

19. A steam trap according to claim 18 wherein the thermoresponsive means is free of contact with the float means when the temperature within the compartment is at an elevated temperature to avoid transmission of any vibrations occurring at the float means to the thermoresponsive means.

* * * * *